United States Patent Office 3,074,977
Patented Jan. 22, 1963

3,074,977
PROCESS FOR THE MANUFACTURE OF 16-METH-
YLENE CORTICOIDS AND INTERMEDIATES OB-
TAINED THEREIN
Heinz-Jurgen Mannhardt, Darmstadt, Karl-Heinz Bork, Griesheim, near Darmstadt, and Klaus Bruckner and Harald Metz, Darmstadt, Germany, assignors to E. Merck Aktiengesellschaft, Darmstadt, Germany, a corporation of Germany
No Drawing. Filed Jan. 28, 1960, Ser. No. 5,105
Claims priority, application Germany Jan. 31, 1959
4 Claims. (Cl. 260—397.4)

The present invention relates to an improved process for the manufacture of 16-methylene derivatives of steroids having adrenocortical properties, such as cortisone, hydrocortisone, prednisone, and prednisolone, and of their 9α-halo analogues, and to intermediates obtained in the course of such process.

The 16-methylene corticoids have pronounced adrenocortical and particularly anti-inflammatory properties and can be used similarly to the analogues devoid of the 16-methylene group.

Heretofore only one process for the manufacture of these compounds has been proposed (cf. U.S. Patent No. 2,865,808). The starting material in this known method is 16α-hydroxy-hydrocortisone, which is converted by a series of steps (at least 9 to 14) into a 16-methylene corticoid. The 16α-hydroxy hydrocortisone itself can only be obtained by a large number of additional steps.

It is the general object of this invention to provide a synthesis of 16-methylene corticoids by a procedure involving a minimum number of steps from readily available starting materials.

We have found that 16-methylene corticoids can be produced in good yields by using the 16-methyl-5,16-pregnadiene-3β-ol-20-one-3-acetate (I), obtainable by known methods, as starting material.

According to the invention, it is possible to introduce a 16,17-oxido group into compound I by means of $H_2O_2$. The oxido steroid (II) thus obtained can be converted by HBr and subsequent catalytic reduction, or by treatment with catalytic amounts of a strong acid in a benzene or other neutral solution, into 16-methylene-5-pregnene-3β,17α-diol-20-one (Va) or the 3-acetate (Vb) thereof. The compound Vb can be brominated by bromine to yield the tribromo compound (VI). By subsequent reactions with, for example, NaI and potassium acetate, the 16-methylene-5-pregnene-3β,17α,21-triol-20-one-3,21-diacetate (VII) is obtained which can be converted by treatment with, for example, *Flavobacterium dehydrogenans* into 16-methylene-Reichstein's Compound S (VIII).

The 16-methylene-Reichstein's Compound S may, according to known methods, be dehydrogenated in the 1,2-position or hydroxylated in the 11α- or 11β-position, or subjected to both conversions. The 11-hydroxy compounds thus obtained may be converted, also by known methods, by dehydration followed by treatment with hypochlorous or hypobromous acid, or by dehydration followed by epoxidation and treatment with hydrofluoric acid, into 9α-halo 11β-hydroxy derivative, while such 11β-hydroxyl group, or the hydroxyl group of an 11α- or 11β-hydroxylated 16-methylene-Reichstein's Compound S, with or without a double bond in the 1,2-position, can be oxidized to ketonic oxygen, while any free 21-hydroxyl group can be esterified by any pharmaceutically acceptable acylating agent, so that compounds of the following general formula A are obtained:

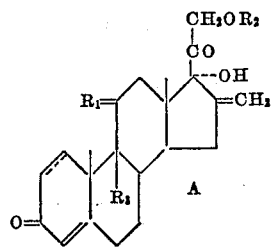

In this formula,
$R_1$=H, H
  H, OH (α or β) or =O,
$R_2$=H or acyl, preferably a lower aliphatic acyl,
$R_3$=H, F, Cl or Br,
The dotted line between the 1,2 carbons indicating the optional presence of a further double bond,
and wherein $R_1$ and $R_3$ are not both H if there is no double bond in the 1,2-position.

According to our new synthesis, it is thus possible to obtain 16-methylene-Reichstein's Compound S in five steps from the known 16-methyl-5,16-pregnadiene-3β-ol-20-one (I). The complete process of the present invention is graphically illustrated by the following series of equations:

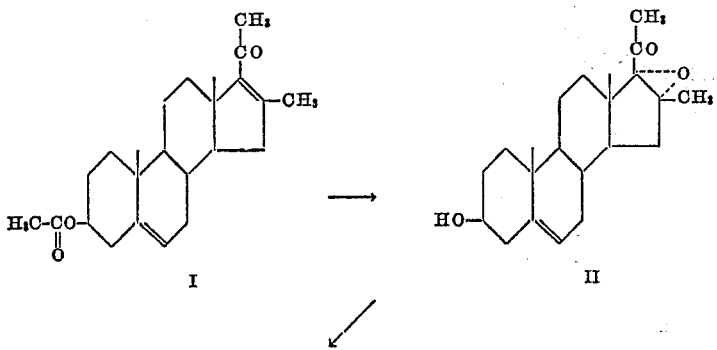

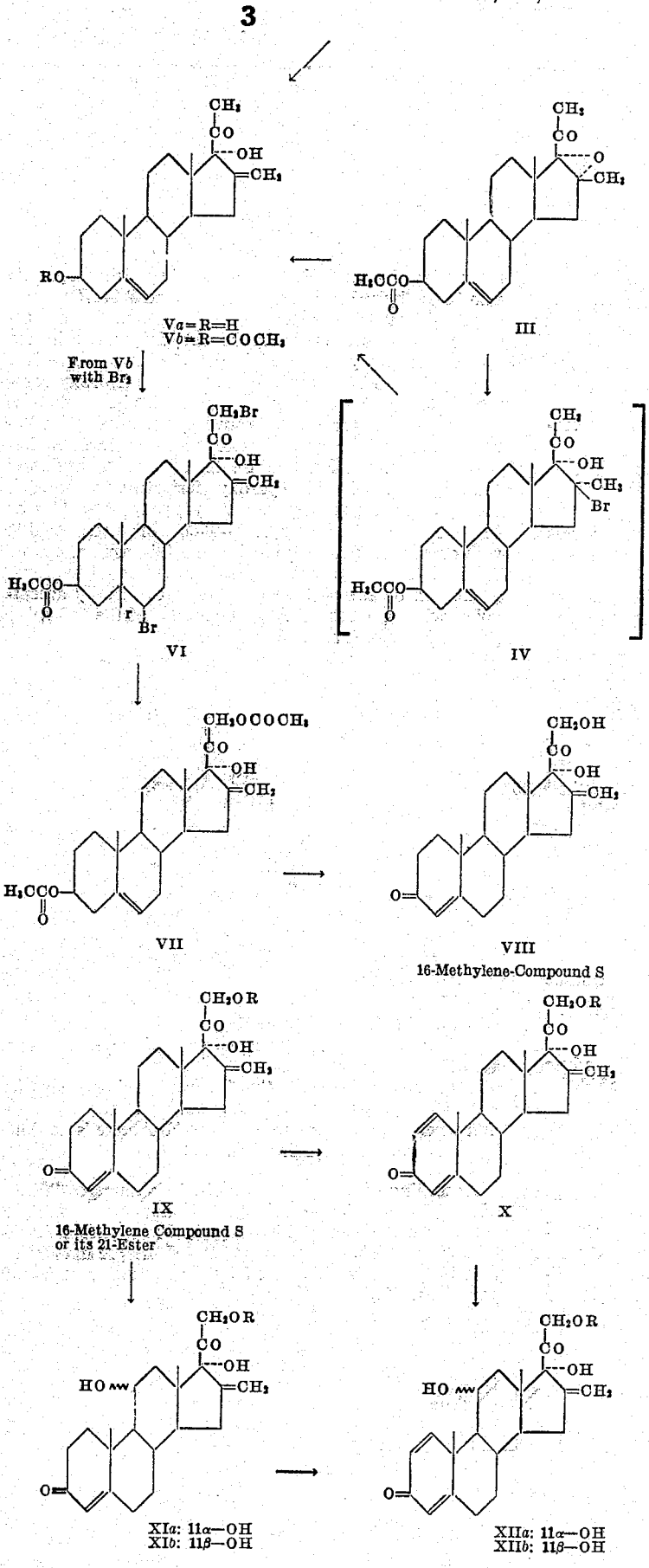

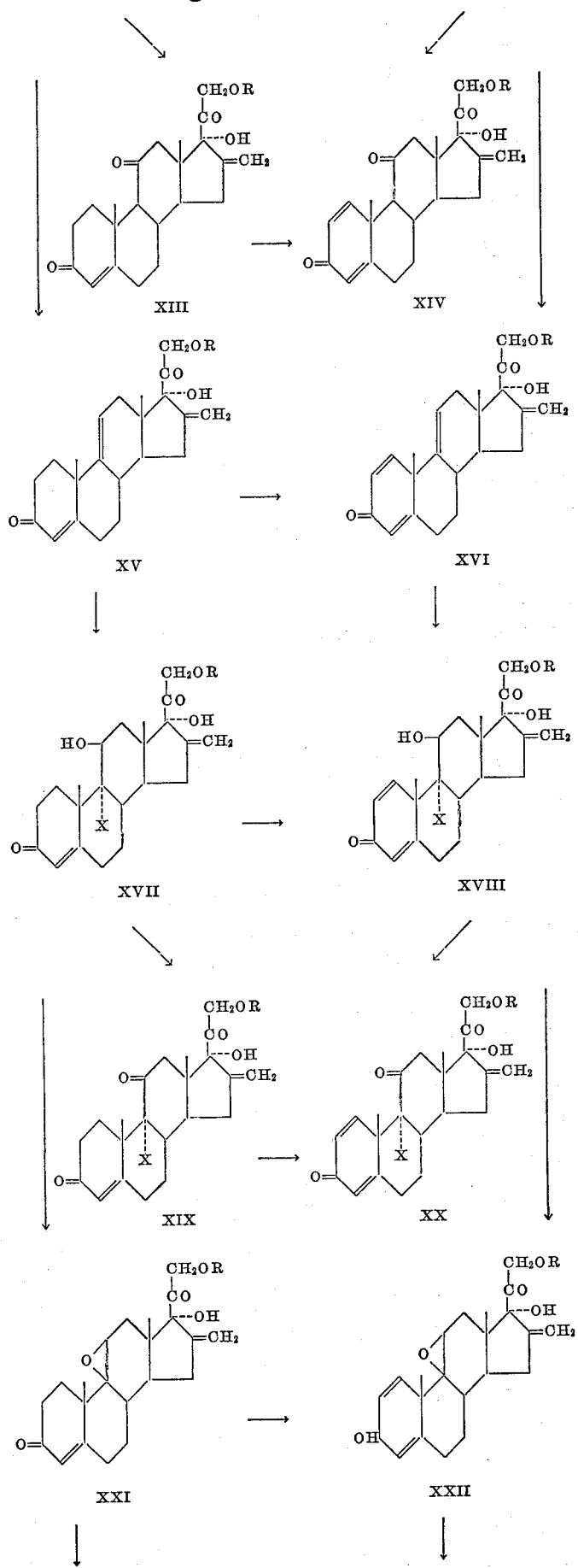

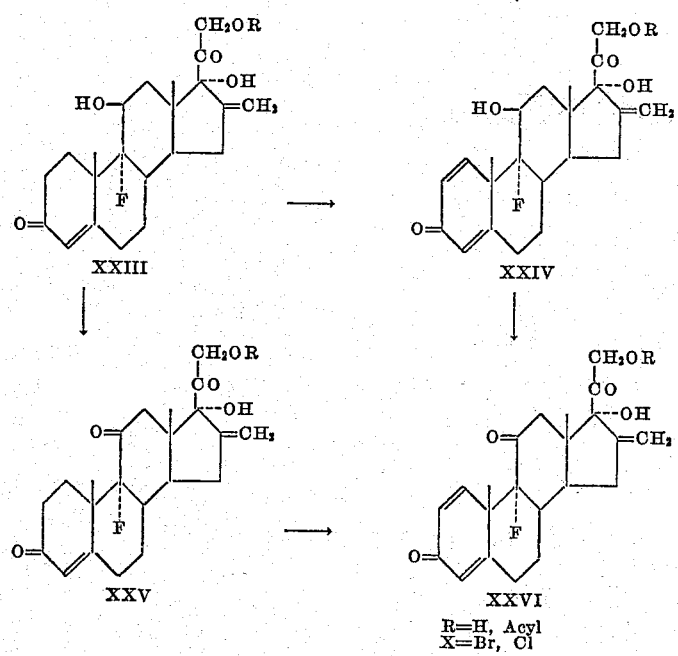

R=H, Acyl
X=Br, Cl

More specifically, the process of the invention is characterized by the following steps: 16-methyl-5,16-pregnadiene-3β-ol-20-one 3-acetate (I) is treated with H₂O₂ in an alkaline medium to form 16β-methyl-16α,17α-oxido-5-pregnene-3β-ol-20-one (II). This compound is converted by reaction with an acetylating agent into 16β-methyl-16α,17α-oxido-5-pregnene-3β-ol-20-one-3-acetate (III), which is treated with HBr to form 16β-bromo-16α-methyl-5-pregnene-3β,17α-diol-20-one-3-acetate (IV). This bromo compound (IV) may be reacted according to known methods with reducing agents to eliminate the bromine, whereby 16-methylene-5-pregnene-3β,17α-diol-20-one 3-acetate (Vb) is formed. By an alternative procedure, compound II or III is heated with at least catalytic amounts of a strong acid, such as a sulfonic acid, preferably p-toluene sulfonic acid, in a suitable inert solvent, such as benzene, to form compound Va or Vb. Compound Vb is converted into 5,6,21-tribromo-16-methylene-pregnane-3β,17α-diol-20-one 3-acetate (VI) by reaction with at least two moles of elementary bromine. By subsequent treatment with an iodide and an acetate, preferably NaI and potassium acetate, VI is converted into 16-methylene-5-pregnene-3β,17α,21-triol-20-one 3,21-diacetate (VII). This ester is subjected to treatment with a culture of a hydrolyzing and oxidizing microorganism, such as Flavobacterium dehydrogenans, or an enzyme thereof, to form 16-methylene-4-pregnene-17α,21-diol-3,20-dione (VIII) which is isolated from the reaction mixture and is treated, if desired, with chemical or microbiological 1,2-dehydrogenating agents. An 11α or 11β-OH group may be introduced by 11-hydroxylating microorganisms and, if desired, subsequent treatment with a dehydrating agent, a hypohalous acid, an alkali metal acetate or an organic base, and with H₂F₂, will yield a 9α-fluoro-11β-hydroxy compound. Reaction with an acylating agent will convert a free 21-hydroxyl into an ester group, while subsequent treatment with mild oxidizing agents will convert the 11-hydroxyl into ketonic oxygen, as already indicated, so that compounds of the general formula A will be obtained. The sequence of certain of these reactions may be varied in ways that will be obvious to persons skilled in this art.

The starting material 16-methyl-5,16-pregnadiene-3β-ol-20-one 3-acetate (I) can be obtained by addition of diazomethane to the 16,17 double bond of 5,16-pregnadiene-3β-ol-20-one 3 acetate (which may be obtained as a technical product from diosgenin) and by subsequent pyrolysis of the pyrazoline derivative thus obtained (cf. Wettstein, Helvetica Chimca Acta, vol. 27, p. 1803 (1944)).

According to the invention, the 16-methylpregnadienolone-3-acetate (I) yields 16α,17α-oxido-16β-methyl-5-pregnene-3β-ol-20-one (II) by treatment with NaOH and H₂O₂. The simultaneously regenerated OH-group in the 3-position of compound II may be transformed into an acetoxy group by treatment with a mixture of acetic acid anhydride and pyridine.

The opening of the 16α,17α-oxido ring of compound III according to the method of Julian et al. (J. Am. Chem. Soc., vol. 71, p. 3574 (1949)) with HBr-glacial acetic acid was not possible with such compound. We have found, however, that in an ethereal solution, at a temperature of about —10° C., the oxido ring could be opened in good yield with hydrobromic acid. We have found further that it is advantageous not to isolate the obtained bromocompound IV from the reaction mixture but to use the resultant solution directly for the subsequent debromination. For this purpose, the HBr in the solution is eliminated by addition of a basic substance, such as for example CaCO₃. Then the reaction mixture is diluted with ethanol, and a known catalyst, such as palladium/CaCO₃ or palladium/MgO, is added. The elimination of the bromine as HBr by hydrogenation is effected in known manner, and the 16-methylene-5-pregnene-3β,17α-diol-20-one 3-acetate (Vb) is obtained by known methods.

The compounds Va and Vb, respectively, can be obtained directly from the compounds II or III. The 16α,17α-oxido ring of these compounds may be opened by treatment with at least catalytic amounts of a strong acid. For example, hydrogen halides, such as hydrochloric or hydrobromic acid, sulfuric acid, arylsulfonic acids, such as para-toluene sulfonic acid, lower alkyl sulfonic acids, such as methane sulfonic acid, perchloric acid and Lewis acids, such as BF₃, are suitable for this reaction. Preferably para-toluene sulfonic or hydrochloric acid is used. The reaction is carried out in the presence of an organic solvent, e.g. hydrocarbons, chlorinated hydrocarbons, alcohols, ethers, esters such as ethyl acetate, ketones such as acetone or methyl-ethylketone, or solvents such as glacial acetic acid and acetic acid anhydride.

The compound II or III is dissolved in the organic solvent, for example in benzene, and the strong acid is added. By standing for several hours or by boiling the reaction mixture, the 16α,17α-oxido ring is opened to form the corresponding 16-methylene-17α-hydroxy compounds Va and Vb, respectively, in good yields.

For the introduction of a 21-OH group, the acetate Vb is treated in a suitable solvent, such as glacial acetic acid/chloroform, with at least 2 moles of bromine, adding a small amount of a hydrogen halide as catalyst. Thus the tribromocompound VI is obtained. The crude product of this bromination is treated with NaI, for example, in an acetone solution, whereby the 21-Br is exchanged for I and the 5,6-double bond restored. By boiling with an alkali acetate, preferably potassium acetate, the 21-I is substituted by the acetoxy group and 16-methylene-5-pregnene-3β,17α,21-triol-3,21-diacetate (VII) is obtained in good yields.

By treatment of VII with a culture of *Flavobacterium dehydrogenans* or an enzyme thereof, 16-methylene-Reichstein's Compound S (VIII) may be produced in excellent yields.

As nutrient solution for *Flavobacterium dehydrogenans*, an aqueous solution of a yeast extract (1%) buffered to pH 7 is used. After 10-16 hours at about 28° C., compound VII is added to the culture. The incubation is continued with aeration for another 6 hours. The reaction is controlled by measuring the UV spectra.

16-methylene-Reichstein's Compound S can be dehydrogenated in the 1,2-position preferably by microbiological means.

For this reaction, the following microorganisms are suitable:

*Bacillus sphaericus, Fusarium solani, Corynebacterium simplex,* Alternaria sp., *Mycobacterium smegmatis, Calonectria decora, Mycobacterium lacticola,* Ophiobolus sp., Alcaligenes sp., *Didymella lycopersici,* Protaminobacter sp., *Septomyxa affinis,* Nocardia sp., *Cylindrocarpon radicicula, Streptomyces lavendulae, Bacillus cyclooxydans.*

Four to fourteen hours are necessary for the fermentation depending on the microorganism used. Particularly suitable are cultures of *Bacillus sphaericus* and its variants, and *Corynebacterium simplex* and *hoagii*.

For the introduction of an OH-group in the 11α- or 11β-position into compound VIII or X the following microorganisms are suitable:

11β-OH

*Curvularia lunata, Cunninghamella blakesleeana, Mucor griseocyanus,* Cephalothecium sp., Trichothecium sp., *Botrytis cinerea,* Coniothyrium sp., Thamnidium sp., *Streptomces fradias,* Rhodoseptoria sp., Colletotrichum sp., Dothiachiza sp., *Absidia glauca,* Pycnosporium sp.

11α-OH

Rhizopus (various species), Aspergillus (various species), Penicillium (various species), Fusarium (various species), *Neurospora sitophila,* Tricothecium sp., *Cephalothecium roseum, Pestalotia foedans, Dactylium dendroides, Heliøcostylum piriforme,* Thamnidium sp., *Eurotium chevalieri, Mucor javanicus* and various other species, *Delacroixia coronata, Absidia glauca, Cunninghamella echinulata,* and other species of Mucorales.

The microbiological 11-hydroxylation is conducted according to known methods. When using fungi of the genus Fusarium particularly good yields are obtained because the starting material is completely converted, thus avoiding difficult separation procedures.

The compounds listed in scheme II may be esterified by known methods in the 21-position. For esterification, for example, the halogeno compounds or anhydrides of the following acids may be used: acetic acid and its homologues, preferably lower alkanoic acids, e.g. propionic, tert. butyl acetic and valeric acids; succinic acid and its homologues; amino- and alkylamino carboxylic acids and amino-dicarboxylic acids, such as alanine phenylalanine, tyrosine, aspartic acid, glutamic acid, and the like; phthalic and tetrahydrophthalic acids; cyclopentyl and cyclohexyl-propionic acids; and inorganic acids like phosphoric acid, sulfuric acid, etc.

The 11-OH group can be oxidized by treatment with a mild oxidizing agent, such as chromic acid, a mixture of chromic acid anhydride and sulfuric acid in an acetone solution, or with hypobromous acid, to form the 11-keto group.

The 11-hydroxy-steroids may be dehydrated to introduce a double bond in the 9,11-position. For 11β-OH steroids, all usual trans-dehydrating agents are suitable, such as $POCl_3$, or $SOCl_2$ in pyridine. In the case of 11α-OH steroids, the usual cis-dehydrating methods can be used, e.g. esterification of the α-OH group and subsequent elimination of the corresponding acid by basic agents, or by a thermal reaction.

According to known methods, hypohalous acids may be added at the 9,11-double bond of the 16-methylene-4,9(11)-pregnadienes or 16-methylene-1,4,9(11)-pregnatrienes. Preferably HOCl or HOBr is used. The 11β-OH-9α-Cl or 11β-OH-9α-Br steroids (XVII, XVIII) thus obtained may be reacted with an alkali acetate, for example, potassium acetate, to form the corresponding 9β,11β-oxido compounds (XXI, XXII). By the same reaction, XVII and XVIII may be oxidized to form XIX or XX, for example, by treatment of XV or XVI with an excess of a hypohalous acid.

By treatment of the 9β,11β-oxido compounds (XXI and XXII) with hydrogen fluoride the corresponding 9α-fluoro-11β-hydroxy-steroids (XXIII, XXIV) are obtained.

XXIII and XXIV may also be oxidized to form the corresponding ketones (XXV and XXVI). Chromic acid, a mixture of chromic acid anhydride and sulfuric acid in an acetone solution or HOBr may be used as oxidizing agents.

In this sequence of reactions, too, the order of certain of the steps can be changed.

The method according to the invention represents an essential technical progress compared to the known method of manufacturing 16-methylene steroids. According to the process described in the U.S. Patent No. 2,865,808, it is proposed to produce 9α-fluoro-16-methylene-prednisolone from 16α-hydroxy-hydrocortisone in 14 reaction steps. According to the present invention, however, this fluoro steroid may be prepared in 11 steps starting from 5,16-pregnadien-3-ol-20-one 3-acetate. For an adequate evaluation of the striking advantages of our invention it should be noted that 10 steps are required to prepare 16α-hydroxy-hydrocortisone from pregnadienolone 3-acetate.

Furthermore, the method disclosed by the Patent No. 2,865,808 is inoperative. It has been found that the process described therein is uncapable of producing the desired useful 16-methylene steroids. This is mainly due to the fact that the reaction with $SeO_2$ does not yield the 1-dehydro compounds if the starting material contains a 16-methylene group.

The above mentioned patent does not reveal anywhere the particular characteristics of the 16-methylene steroids claimed therein.

We have now found for the first time an operative method for producing the useful 16-methylene steroids. In addition, we have discovered and described in the instant application for the first time the physical and chemical characteristics of said 16-methylene steroids.

The 16-methylene-corticoids produced by the process of this invention are useful as antiphlogistic drugs in all relevant indications in human and veterinary medicine, such as rheumatic arthritis. They are also suitable for the management of refractory allergies.

The process of our invention is described in greater detail in the following examples which are presented by way of illustration only and not as indicating the limits of the invention.

EXAMPLE 1

1-Dehydro-16-Methylene Cortisone

A. *Epoxidation of 16-methyl-5,16-pregnadienolone 3-acetate (I).*—15 g. of 16-methyl-5,16-pregnadienolone 3-acetate (I) (obtained according to Wettstein, locus citatus) are dissolved in 2.5 l. of methanol. The mixture is cooled to 10° C. and 30 ml. of 4n-NaOH and 60 ml. of $H_2O_2$ (30%) are added. After standing for 40 hours at +5° C. the solution is poured into water, the precipitate filtered with suction and recrystallized from methanol. The obtained 16β-methyl-16α,17α-oxido-5-pregnene-3β-ol-20-one (II) melts at 185–186° C. $(\alpha)_D$—24.6° (chloroform).

B. *Acetylation of 16β-methyl-16α,17α-oxido-5-pregnene-3β-ol-20-one (II).*—The compound II, recrystallized once, is heated with 120 ml. of pyridine and 120 ml. of acetic acid anhydride for 1 hour on the steam bath. The solution is poured into water, and the precipitated 16β-methyl-16α,17α-oxido-5-pregnene-3β-ol-20-one 3-acetate (III) is filtered with suction. It is recrystallized from acetone. M.P. 178–180°; $(\alpha)_D$—12.0° (chloroform).

C. *Treatment of III with HBr and debromination.*—3 g. of 16β-methyl-16α,17α-oxido-5-pregnene-3β-ol-20-one acetate (III) are dissolved in 50 ml. of dioxane and 50 ml. of ether. The solution is cooled to —10° with stirring and 10 ml. of a solution of HBr in ether (35%) added. The mixture is stirred for 4 hours at a temperature below 0° C. The solution is diluted with 200 ml. of alcohol (distilled over Raney nickel) 5 g. of $CaCo_3$ are added to eliminate the excess HBr, and stirred for another 30 minutes maintaining this low temperature.

The suspension obtained is added to a slurry of 9 g. of a pre-reduced Pd/$CaCO_3$ (2%) catalyst in 200 ml. of alcohol. The solution is hydrogenated at 0° with normal pressure or slight super pressure until the hydrogen absorption is complete. The catalyst is separated, washed with methanol, concentrated in vacuo and the residue of 16-methylene-5-pregnene-3β,17α-diol-20-one 3-acetate (Vb) is recrystallized from methanol and acetone. M.P. 196–198° C.; $(\alpha)_D$—140° (chloroform).

D. *Bromination of Vb to VI and re-esterification to VII.*—1.55 g. of 16-methylene-5-pregnene-3β,17α-diol-20-one 3 acetate (Vb) are dissolved in 60 ml. of glacial acetic acid and 15 ml. of chloroform and cooled to 5° C. Within 20 minutes, several drops of a solution of HBr in glacial acetic acid and 62 ml. of a solution of bromine in glacial acetic acid (2%) are added with stirring. Stirring is continued after this addition for another ½ hour. The solution is poured into water, extracted with ether and the ethereal layer washed until neutral with an aqueous solution of $NaHCO_3$. The solution is dried over $Na_2SO_4$ and concentrated in vacuo. The tri-bromo compound VI is obtained as an oil which is used without further purification.

The residue is dissolved in 60 ml. of acetone, 1.5 g. of NaI and 6 g. of anhydrous potassium acetate are added and the mixture refluxed for 4 hours. After cooling, the inorganic salt is separated and the solution evaporated in vacuo. The residue is taken up in chloroform, washed with water three times, evaporated in vacuo, dissolved in benzene and eluated over magnesium silicate. The eluate of benzene/chloroform (1:1) contains the diacetate VII, which is recrystallized from acetone. M.P. 195–197°; $(\alpha)_D$—65.7° (chloroform).

E. *Microbiological hydrolysis and oxidation of VII.*—A sterilized nutritive medium containing 80 g. of glucose, 50 g. of yeast extract, 30 g. of $NH_4Cl$ and water to make up 10 l. which is buffered to pH 7 with 1/30 molar phosphate buffer solution according to Sörensen, is inoculated with 200 ml. of a culture of *Flavobacterium dehydrogenans*. The culture is grown at 28° for 12 hours with stirring and aeration. Then a concentrated solution of 12 g. of the diacetate VII in acetone or acetone/dimethylformamide (1:1) is added and the solution left to grow under the same conditions for another 10 hours. The solution is extracted several times with chloroform, dried and concentrated. The residue is recrystallized and yields pure 16-methylene-4-pregnene-17α,21 - diol - 3,20 - dione (VIII). M.P. 207°; $(\alpha)_D$+46.6° (chloroform); $\lambda_{max}$. 240 mμ;

($E_{1cm}^{1\%}$ 480)

F. *11α-hydroxylation.*—In a fermentation vessel 15 l. of a suitable nutrient medium (for example, 5% glucose, 0.1% yeast extract, 0.05 % soybean meal, 0.3% $NaNO_3$, 0.05% $MgSO_4.7H_2O$, 0.1% $KH_2PO_4$, 0.05% KCl, 0.001% $FeSO_4.7H_2O$) are inoculated with 750 ml. of a culture of Fusarium sp.

The culture grows with vigorous stirring and aeration at 28° C. After 24 hours, 5 g. of 16-methylene-Reichstein's Compound S (VIII) in 40 ml. dimethyl-formamide are added. The reaction is controlled by a paper chromatogram. As soon as no more starting material can be detected the reaction is stopped and the mixture extracted three times with chloroform. The chloroform is evaporated, the residue washed with petroleum ether and recrystallized from acetone. M.P. of 16-methylene-11-epihydrocortisone (XIa) 199–201°; $(\alpha)_D$+41.7° (dioxane; $\lambda_{max}$. 241 mμ;

($E_{1cm}^{1\%}$ 445)

G. *21-acetylation of XIa.*—2 g. of 16-methylene-11-epihydrocortisone are dissolved in 10 ml. of pyridine and 0.36 g. of glacial acetic acid anhydride added. After standing at room temperature for 15 hours, the solution is poured into water, extracted with chloroform three times, the chloroform solution neutralized with a solution of $NaHCO_3$, dried and evaporated in vacuo. The amorphous residue of 16-methylene-11-epihydrocortisone-21-acetate (XIa, R=acetyl) is used for the following oxidation.

H. *Oxidation.*—2.7 g. of 16-methylene-11-epihydrocortisone acetate are dissolved in 100 ml. of acetone and cooled to a temperature of 0 to 10° C. While stirring and cooling, 192 ml. of a solution of chromic acid anhydride in sulfuric acid/water (1 ml. containing 0.25 g. of $CrO_3$) are added. The temperature is maintained below 10° C. After stirring for 30 minutes, the reaction mixture is poured into water and extracted with chloroform. The chloroform solution is washed to neutrality, dried and evaporated. The 16-methylenecortisone acetate melts upon recrystallization from ether/acetone at 213 to 214°. $(\alpha)_D$+140° (dioxane); $\lambda_{max}$. 237 mμ;

$E_{1cm}^{1\%}$ 409

I. *Saponification.*—1 g. of 16-methylene-cortisone-21-acetate is boiled with 25 ml. of methanol. To this solution, a hot solution of 0.23 g. of $NaHCO_3$ in 5 ml. of water is added and boiled for 7 minutes. The solution is poured into 300 ml. of water and the precipitated crude product is filtered under suction. Upon recrystallization from acetone the pure 16-methylene-cortisone is obtained. M.P. 219–220°; $(\alpha)_D$+136° (dioxane); $\lambda_{max}$. 237 mμ;

$E_{1cm}^{1\%}$ 453

J. *1-dehydrogenation.*—In a fermentation vessel of 20 l. content 15 l. of a nutrient solution consisting of 0.1% yeast extract, pH 6.8, are inoculated with 1.5 l. of a culture of *Corynebacterium simplex*. The culture is grown with constant stirring and aeration at 28°. After 4–8 hours, 7.5 g. of 16-methylene-cortisone dissolved in 300 ml. of methanol are added. The dehydrogenation is controlled by paper chromatography and is usually finished after 10–14 hours. The solution is extracted three times with chloroform, the extracts are evaporated and the residue is recrystallized from acetone. The 16-methylene-prednisone (XIV) obtained is free from byproducts. M.P. 218–219°; $(\alpha)_D +103°$ (dioxane); $\lambda_{max}$. 238 m$\mu$;

$E^{1\%}_{1 cm.}$ 434

EXAMPLE 2

*16-Methylene-5-Pregnene-3β,17α-Diol-20-One 3-Acetate (Vb)*

A. 9.3 g. of the epoxide (III) obtained according to Example 1 are dissolved in 350 ml. of anhydrous benzene and refluxed for 4 hours with 630 mg. of p-toluene sulfonic acid. Upon cooling, the benzene solution is washed with a solution of NaHCO$_3$ (5%) and with water, dried and evaporated. Crystallized 16-methylene-5-pregnene-3β,17α-diol-20-one 3-acetate (Vb) with a melting point of 187–193° is obtained. Upon recrystallization from methanol compound Vb melts at 196–198°.

This 3-ester can then be converted to 16-methylene Reichstein's Compound S (VIII) according to the procedures described in Example 1.

B. To a solution of 5 g. of 16β-methyl-16α,17α-oxido-5-pregnene-3β-ol-20-one-acetate in 50 ml. of dioxane, 0.1 ml. of concentrated sulfuric acid are added. The mixture is heated for 1 hour to 100° C. and poured into 1 l. of water. The precipitate (Vb) is sucked off and recrystallized from methanol.

C. 2.0 g. of 16β-methyl-16α,17α-oxido-5-pregnene-3β-ol-20-one-acetate are dissolved with heating in 80 ml. of glacial acetic acid. Then 18.2 mg. of hydrochloric acid in glacial acetic acid are added. The mixture is allowed to stand for 48 hours at room temperature and then is poured into water. The precipitate (Vb) is sucked off and recrystallized from methanol.

D. 0.1 g. of methane sulfonic acid is added to a solution of 16β-methyl-16α,17α-oxido-5-pregnene-3β-ol-20-one-acetate in 60 ml. of benzene. The mixture is refluxed for 3 hours with continuous separation of water, then washed with an aqueous solution of NaHCO$_3$, dried and evaporated. The residue (Vb) is recrystalized from methanol.

E. 2 g. of 16β-methyl-16α,17α-oxido-5-pregnene-3β-ol-20-one-acetate are added to 20 ml. of benzene containing 21 mg. of HBr. The solution is refluxed for 2 hours and evaporated. The residue (Vb) is recrystallized from methanol.

F. 0.036 ml. of BF$_3$/ether are added to a solution of 1 g. of 16β-methyl-16α,17α-oxido-5-pregnene-3β-ol-20-one-acetate in 10 ml. of benzene. The mixture stands for 16 hours at room temperature. Then it is washed with an aqueous solution of NaHCO$_3$ and water, dried and evaporated. The residue (Vb) is recrystallized from methanol.

G. To a solution of 5 g. of 16β-methyl-16α,17α-oxido-5-pregnene-3β-ol-20-one-acetate in a mixture of 300 ml. of ether and 100 ml. of benzene there are added 15.5 ml. of a solution of para-toluene sulfonic acid in ether (14.45%). The solution stands for 60 hours at room temperature and is then evaporated under reduced pressure at a bath temperature of 20° C. The residue is treated with 25 ml. of methanol, and the pure 16-methylene-5-pregnene-3β,17α-diol-20-one-acetate is sucked off.

EXAMPLE 3

A. *Dehydration of XIa.*—5 g. of 16-methylene-11-epi-hydrocortisone (XIa, obtained according to Example 1) are converted according to Example 1-G into the 21-monoacetate. The ester is dissolved in 25 ml. of anhydrous chloroform and 25 ml. of pyridine. Upon cooling to 0° and stirring 7 g. of p-toluene sulfonic acid chloride are added. The solution is stirred for 2 hours and allowed to stand overnight at room temperature. The solution is poured into water, extracted repeatedly with chloroform, and the combined chloroform solutions are neutralized and dried. Upon evaporation the residue of 16-methylene-11-epi-hydrocortisone-11-tosylate-21-acetate is recrystallized from methanol. M.P. 160–161°; $(\alpha)_D +66.6°$ (chloroform); $\lambda_{max}$. 229 m$\mu$;

$E^{1\%}_{1 cm.}$ 433

The ester thus obtained is dissolved in 75 ml of glacial acetic acid and refluxed for 30 minutes after addition of 9 g. of anhydrous sodium acetate. The mixture is poured into 500 ml. of water and the precipitate of 16-methylene-4,9(11)-pregnadiene-17α,21-diol-3,20-dione 21 acetate is filtered with suction. Upon recrystallization from ethyl acetate, a product with a melting point of 210–212° is obtained. $(\alpha)_D +42.6°$ (dioxane); $\lambda_{max}$. 238.5m$\mu$;

$E^{1\%}_{1 cm.}$ 421

B. *Addition of HOBr.*—7.8 g. of 16-methylene-4,9(11)-pregnadiene-17α,21-diol-3,20-dione 21-acetate are dissolved in 315 ml. of dioxane and 40 ml. of water. 4.55 g. of N-bromosuccinimide and 1.68 ml. perchloric acid (70%) are added. The mixture is allowed to stand for 1 hour at room temperature. Then it is poured into water. The precipitate is filtered with suction, washed with water and dried. The crude 16-methylene-9α-bromo-hydrocortisone-21-acetate is used directly for the following reaction.

C. *Elimination of HBr.*—The crude 16-methylene-9α-bromo-hydrocortisone 21-acetate obtained as described above is dissolved in 450 ml. of ethanol and refluxed for 2 hours after addition of 19 g. of potassium acetate. The mixture is poured into water, extracted several times with chloroform. The chloroform solutions are evaporated and the residue is recrystallized from methanol. The 16-methylene-9β,11β-oxido-4-pregnene-17α,21-diol-3,20-dione 21acetate melts at 210–211°; $(\alpha)_D -34.7°$ (dioxane); $\lambda_{max}$. 243 m$\mu$;

$E^{1\%}_{1 cm.}$ 390

D. *Treatment with H$_2$F$_2$.*—4.2 g. of 16-methylene-9β,11β-oxido-4-pregnene-17α,21-diol-3,20-dione 21-acetate are dissolved in 42 ml. of anhydrous chloroform and added at −60° to 25 ml. of a mixture of 40 ml. of tetrahydrofuran, 15 ml. of chloroform and 25 g. of H$_2$F$_2$. The reaction mixture is allowed to stand for 4 hours at −30° and for 4 hours at 0°. The solution is poured into a solution of NaHCO$_3$. The steroid is extracted with chloroform. Upon evaporation the residue is recrystallized from acetone. The obtained 9α-fluoro-16-methylen-hydrocortisone 21-acetate melts at 209–211°; $(\alpha)_D +71.4°$ (chloroform); $\lambda_{max}$. 238 m$\mu$;

$E^{1\%}_{1 cm.}$ 399

E. *Saponification.*—9α-fluoro-16-methylene-hydrocortisone acetate is saponified according to Example 1-I to yield 9α-fluoro-16-methylene-hydrocortisone. M.P. 242–244°; $(\alpha)_D +80°$ (dioxane); $\lambda_{max}$. 238 m$\mu$;

$E^{1\%}_{1 cm.}$ 449

F. *1-dehydrogenation.*—In a fermentation vessel 15 l. of a nutrient solution containing 1% yeast extract; pH 6.8, are inoculated with 0.5 l. of a culture of *Bacillus sphaericus*. The culture is grown at 28° and after 10 hours 7.5 g. of 9α-fluoro-16-methylene-hydrocortisone in 300 ml. of methanol are added. After 28–36 hours dehydrogenation is complete. The reaction mixture is treated according to Example 1-J. The 9α-fluoro-16-methylene-prednisolone is recrystallized from ethanol. M.P. 246–248°; $(\alpha)_D +26.6°$ (dioxane); $\lambda_{max}$. 238.5 m$\mu$;

$E^{1\%}_{1 cm.}$ 410

The 9α-fluoro-16-methylene-prednisolone 21-acetate melts at 223–224°; $\lambda_{max}$. 238m$\mu$;

$E^{1\%}_{1 cm.}$ 379

EXAMPLE 4

A. *Hydroxylation of 16-methylene Compound S.*—In a fermentation vessel 15 l. of a nutrient solution containing 5% malt extract, 1% saccharose, 0.2% NaNO₃, 0.1% K₂HPO₄, 0.05% MgSO₄, 0.05% KCl and 0.005% FeSO₄, pH 7.0, are inoculated with 800 ml. of a culture of *Curvularia lunata* (Wakker) Boadijn. After growth of 24 hours at 28° 5 g. 16-methylene-Reichstein's Compound S (obtained according to Example 1) dissolved in 40 ml. dimethylformamide are added. As soon as the paper chromatogram no longer shows any starting material, the culture is extracted three times with chloroform. The chloroform extracts are evaporated and the residue is isolated by chromotographic filtration through silica gel. The eluate running off with chloroform/ethyl acetate (1:3) contains 16-methylene-hydrocortisone. M.P. 224–225°; $(\alpha)_D$+69.2° (dioxane); $\lambda_{max}$ 241 m$\mu$;

$E_{1\,cm.}^{1\%}$ 466

B. *Acetylation.*—5 g. of 16-methylene-hydrocortisone are heated with 30 ml. of pyridine and 30 ml. of acetic acid anhydride for 1 hour on the steam bath. The solution is poured into water and the precipitated 16-methylene-hydrocortisone acetate filtered with suction. Upon recrystallization from acetone the acetate of M.P. 207–209° is obtained.

C. *1-dehydrogenation.*—According to Example 3–F, 5 g. of 16-methylene-hydrocortisone are dehydrogenated with *Bacillus sphaericus*. The 16-methylene-prednisolone obtained melts at 225 to 226° C.;

$(\alpha)_D$+21.9°; $E_{1\,cm.}^{1\%}$ 427; $\lambda_{max}$ 243 m$\mu$

EXAMPLE 5

A. *Delta-1-dehydrogenation (microbiological) of 16-methylene-Reichstein's Compound S.*—7.5 g. of 16-methylene-Reichstein's Compound S obtained according to Example 1–E are dehydrogenated in 15 l. of a culture of *Bacillus sphaericus* as described in Example 3–F. Upon treatment according to Example 1–J 1-dehydro-16-methylene-Reichstein's-Compound S is obtained by recrystallization from acetone. M.P. 222–226°; $(\alpha)_D$—16° (chloroform).

B. *Hydroxylation.*—In a fermentation vessel 15 l. of a nutrient solution containing 5% glucose, 0.2% yeast extract, 0.3% NaNO₃, 0.05% MgSO₄, 0.001% FeSO₄ and 1/30 molar phosphate-buffer (Sörensen) (pH 5.6) are inoculated with 800 ml. of a culture of Penicillium sp.

After 24 hours, 5 g. of 1-dehydro-16-methylene-Reichstein's Compound S in 40 ml. of dimethylformamide are added. The hydroxylation is controlled by paper chromatogram. The solution is treated as described in Example 1–J. Upon recrystallization from acetone 16-methylene-11-epi-prednisolone is obtained.

C. *Dehydration.*—In the manner described in Example 3–A, 16-methylene-1,4,9(11)-pregnatriene-17α,21-diol-3,20-dione 21-acetate is prepared from 16-methylene-11-epi-prednisolone (from the 21-acetate and the 11-tosylate 21-acetate).

D. *Addition of HOBr.*—9α-bromo-16-methylene-prednisolone 21-acetate is prepared from 16-methylene-1,4,9 (11)pregnatriene-17α,21-diol-3,20-dione 21-acetate by the procedure described in Example 3–B.

E. *Elimination of HBr.*—Following the procedure of Example 3–C, 16-methylene-9β,11β-oxido-1,4-pregnadiene-17α,21-diol-3,20-dione 21-acetate is prepared from 9α-bromo-16-methylene-prednisolone 21-acetate.

F. *Treatment with H₂F₂.*—9α-fluoro - 16 - methylene-prednisolone 21-acetate is obtained from 16-methylene-9β,11β-oxido-1,4-pregnadiene-17α,21-diol-3,20-dione 21-acetate in accordance with the process of Example 3–D.

G. *Saponification.*—The 9α-fluoro-16-methylene-prednisolone 21-acetate is saponified in the manner described in Example 1–I.

EXAMPLE 6

A. *Oxidation of 9α-fluoro-16-methylene-hydrocortisone 21-acetate.*—As described in Example 1–H, 9α-fluoro-16-methylene-cortisone 21-acetate is obtained from 9α-fluoro-16-methylene-hydrocortisone 21-acetate prepared according to Example 3–D.

B. *Dehydrogenation.*—According to Example 1–J, 9α-fluoro-16-methylene-cortisone-acetate is dehydrogenated to form 9α-fluoro-16-methylene-prednisone.

We claim:

1. In a process for the manufacture of 16-methylene steroids, the step which comprises reacting a member of the group consisting of 16β-methyl-16α,17α-oxido-5-pregnene-3-ol-20-one and its 3-acetate with an acid selected from the group consisting of hydrogen chloride, hydrogen bromide, boron fluoride, sulfuric acid, para-toluene sulfonic acid methane sulfonic acid, and perchloric acid; to effect opening up of the oxido ring with a formation of 17α-hydroxyl and a 16-methylene group.

2. In a process for the manufacture of 16-methylene-prednisolone, the step which comprises reacting a member of the group consisting of 16β-methyl-16α,17α-oxido-5-pregnene-3-ol-20-one and its 3-acetate with an acid selected from the group consisting of hydrogen chloride, hydrogen bromide, boron fluoride, sulfuric acid, para-toluene sulfonic acid, methane sulfonic acid, and perchloric acid; to effect opening up of the oxido ring with a formation of 17α-hydroxyl and a 16-methylene group.

3. In a process for the manufacture of 16-methylene-prednisone, the step which comprises reacting a member of the group consisting of 16β-methyl-16α,17α-oxido-5-pregnene-3-ol-20-one and its 3-acetate with an acid selected from the group consisting of hydrogen chloride, hydrogen bromide, boron fluoride, sulfuric acid, para-toluene sulfonic acid, methane sulfonic acid, and perchloric acid; to effect opening up of the oxido ring with a formation of 17α-hydroxyl and a 16-methylene group.

4. In a process for the manufacture of 9α-fluoro-16-methylene-prednisolone, the step which comprises reacting a member of the group consisting of 16β-methyl-16α,17α-oxido-5-pregnene-3-ol-20-one and its 3-acetate with an acid selected from the group consisting of hydrogen chloride, hydrogen bromide, boron fluoride, sulfuric acid, para-toluene sulfonic acid, methane sulfonic acid, and perchloric acid; to effect opening up of the oxido ring with a formation of 17α-hydroxyl and a 16-methylene group.

References Cited in the file of this patent

UNITED STATES PATENTS

| | | |
|---|---|---|
| 2,844,513 | Wettstein et al. | July 22, 1958 |
| 2,865,808 | Agnello et al. | Dec. 23, 1958 |